United States Patent [19]

Ebisawa et al.

[11] Patent Number: 5,166,806
[45] Date of Patent: Nov. 24, 1992

[54] APPARATUS FOR PLAYING DISKS HAVING DIFFERENT TYPES OF VIDEO SIGNALS RECORDED THEREON

[75] Inventors: Kan Ebisawa, Tokyo; Hiroo Takahashi, Kanagawa; Kenji Hori, Tokyo, all of Japan

[73] Assignee: Sony Corporation, Tokyo, Japan

[21] Appl. No.: 728,588

[22] Filed: Jul. 11, 1991

[30] Foreign Application Priority Data

Jul. 23, 1990 [JP] Japan .................. 2-194582

[51] Int. Cl.⁵ .................. H04N 5/76
[52] U.S. Cl. .................. 358/342; 358/337; 360/36.1; 360/36.2
[58] Field of Search ............... 358/310, 319, 320, 355, 358/337, 339, 342, 343, 338, 322, 324, 325, 326; 560/32, 27, 22, 65, 33.1, 36.1, 36.2, 55

[56] References Cited
U.S. PATENT DOCUMENTS 4,908,722 3/1990 Sonobu .................. 360/46
4,928,287 5/1990 Tanaka .................. 375/13
5,068,753 11/1991 Kanegae .................. 360/46

Primary Examiner—Tommy P. Chin
Assistant Examiner—Robert Chevalier
Attorney, Agent, or Firm—Lewis H. Eslinger; Jay H. Maioli

[57] ABSTRACT

A video disk playback apparatus for playing back a disk shaped record medium on which FM modulated video signals are recorded in spiral shaped tracks or concentric circle shaped tracks includes a pickup apparatus for simultaneously reading at least two tracks adjacently disposed, a first equalizer and a second equalizer to which a first playback signal and a second playback signal are supplied in accordance with the two tracks which are read by the pickup, respectively, and a circuit for controlling at least one characteristic of the first equalizer and the second equalizer, a plurality of the clock signal generation circuits selecting the clock signal generation circuits in accordance with the type of the disk shaped record medium.

5 Claims, 6 Drawing Sheets

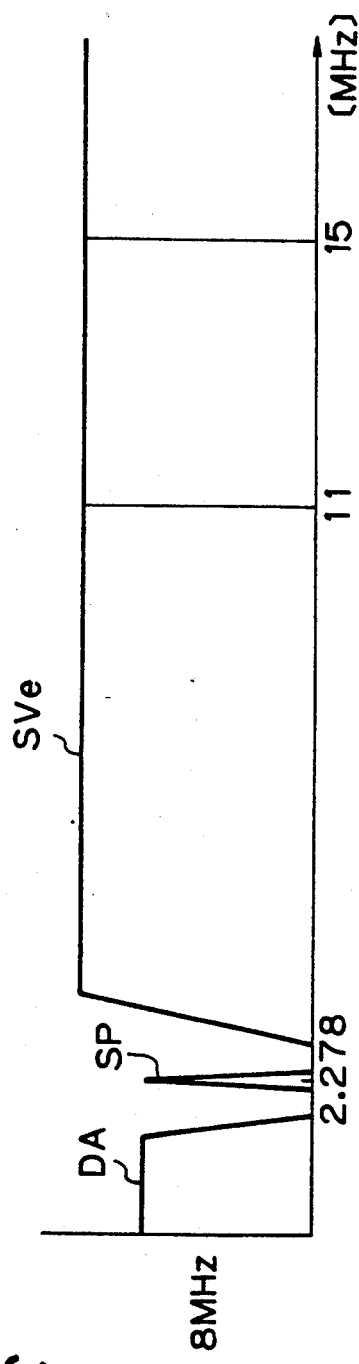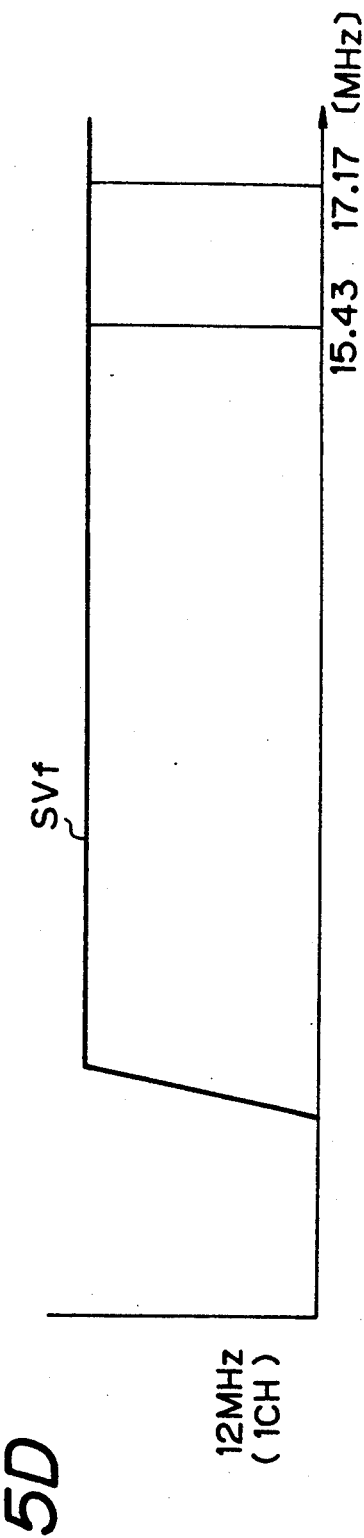
Fig. 5C
Fig. 5D

APPARATUS FOR PLAYING DISKS HAVING DIFFERENT TYPES OF VIDEO SIGNALS RECORDED THEREON

BACKGROUND OF THE INVENTION

1. Field of the Invention

The present invention relates to a video disk playback apparatus for playing back a disk on which high definition video signals are recorded and, in particular, relates to a video disk playback device for playing back a disk on which video signals other than high definition video signals are recorded.

2. Description of the Prior Art

As one of several new television broadcasting methods, high definition television (hereinafter referred to as HDTV) has been proposed. As an output of a HDTV television camera, each primary color signal of R, G, and B occupies a band width of 30 MHz. A signal in this band width is compressed. Thereby, a component signal which is composed of for example a luminance signal with a band width of 22 MHz and two color difference signals with a band width 6 MHz is formed. When the component signal is recorded on an optical type video disk, with respect to the luminance signal, the time base expansion process is performed. With respect to the color difference signals, the time base compression process and the line sequential process are performed. Thereby, record signals in two channels are formed. After the record signal in each channel is FM modulated, it is divided and recorded on two tracks.

FIG. 1 is a block diagram of a playback circuit for playing back an HDTV video disk which has been proposed. In the figure, reference numeral 1 is an optical type disk, on which spiral tracks are formed on one or both surfaces thereof at particular pitches. A spindle servo circuit 3 is provided so that the disk 1 is rotated in a CLV with a spindle motor 2. Reference numeral 4 is an optical head. The optical head 4 is movable in the radius direction of the disk 1 with a feed motor such as a linear motor (which is not shown in the figure). With respect to the optical head 4, a pickup servo circuit 5 for controlling a head feed servo, a tracking servo, and a focus servo is provided.

The optical head 4 diffracts one laser beam into three laser beams which are disposed in closely adjacent positions in the radius direction of the disk 1. The spot of the center beam is positioned at the boundary of the adjacent two tracks. The spots of side beams on both the sides are positioned at the center of each track. The light intensity of the side beams is larger than that of the center beam. With the two side beams, two tracks are played back. By using the difference of playback outputs between the center beam and one side beam and the difference of playback outputs between the center beam and the other side beam, the tracking control is performed. In the above mentioned manner, the disk 1 is played back in parallel on two tracks at a time.

When the playback outputs of the two side beams are named a first channel and a second channel, a playback RF signal in the first channel is sent to an amplifier 11. In addition, a playback RF signal in the second channel is sent to an amplifier 21. An output signal of the amplifier 11 is sent to an FM demodulator 14 through a high pass filter 12 and an RF equalizer 13. The RF equalizer 13 compensates the FM modulation signal for a gain drop in the vicinity of the center carrier frequency. For example, the RF equalizer 13 has a frequency characteristic of a cosine curve. As a demodulation output of the FM demodulator 14, a time-divided an multiplexed signal in the first channel is obtained.

A demodulation output of the FM demodulator 14 is converted into a digital signal by an A/D converter 15. An output signal of the A/D converter 15 is sent to a TBC (time base compensator) 16. The TBC 16 is composed of a memory with a storage capacity in accordance with the compensation amount of the time base fluctuation component and a memory control circuit. By using a write clock WCK with the same time base fluctuation component as the playback signal, the time-divided and multiplexed signal is written to the memory of the TBC 16. By using a reference read clock RCK, the playback component signal is read from the memory. The time-divided and multiplexed signal whose time base fluctuation component was removed by the TBC 16 is sent to a video signal process circuit 29 and an audio signal process circuit 30.

Like the above mentioned playback RF signal in the first channel, the playback RF signal in the second channel is sent to an FM demodulator 24 through an amplifier 21, a high pass filter 22, and an RF equalizer 23. A time-divided and multiplexed signal in the second channel is sent from the FM demodulator 24 to the video signal process circuit 29 and the audio signal process circuit 30 through an A/D converter 25 and a TBC 26.

A demodulation output of one FM demodulator, namely the FM demodulator 24 in this example, is sent to a synchronous separation circuit 27 where a playback horizontal synchronous signal is separated. The playback horizontal synchronous signal is sent to a PLL 28. The PLL 28 generates a write clock WCK which has a frequency that is a multiple of the horizontal frequency and which has the same phase fluctuation component as the playback horizontal synchronous signal. The write clock WCK is sent to the TBC 16 and TBC 26.

An HDTV component signal is composed of a luminance signal Y with a band width of 20 MHz and color difference signals CR and CB with a band width of 6 MHz, each signal having a horizontal synchronous signal. When the component signal is recorded on the disk 1, the time base of the luminance signal Y during one horizontal interval is expanded by 5/3 times. On the other hand, the time base of the color difference signals CR and CB are compressed by ½ times. The color difference signals are converted into a line sequential color difference signal where CR and CB are alternatively disposed at each horizontal interval. The time twice the original horizontal interval is referred to as the horizontal interval of a record signal. The luminance signal Y whose time base has been expanded during the new horizontal interval and the line sequence color difference signal CR or CB whose time base has been compressed are time division multiplexed. As an example, at a track in the first channel, a signal where odd numbered luminance signals Y1, Y3, Y5, . . . , and so forth and the color difference signals CB1, CR2, CB5, . . . , and so forth are time division multiplexed and recorded. At a track in the second channel, a signal where even numbered luminance signals Y2, Y4, Y6, . . . , and so forth and the color difference signals CB3, CR4, CB7, . . . , and so forth are time-dividedly and multiplexedly disposed and recorded.

The above mentioned HDTV component signal record method has been proposed by the applicants of the present application and is disclosed in Japanese Patent Application No. SHO 63-335442.

The video signal process circuit 29 serves to separate the luminance signal and the color difference signals, compress the time base of the luminance signal, expand the time base of the color difference signals, and interpolate the color difference signals. The time-divided and multiplexed signals in the channels 1 and 2 are converted into digital component signals (Y, CR, and CB) by the video signal process circuit 29. The component signal is converted into an analog component signal by the D/A converter 31. Thereafter, a playback component signal is obtained from an output terminal 32.

The time base of a PCM audio signal has been compressed during a vertical blanking interval. The audio signal process circuit 30 separates the PCM audio signal, expands the time base, and corrects an error thereof. Thereafter, the audio signal process circuit 30 outputs digital audio signals in two channels. The playback digital audio signals are converted into analog signals by the D/A converter 33 and then obtained from the output terminal 34.

Since the above mentioned HDTV video disk playback apparatus conventionally does not have compatibility with other types of video disks, it is used as a dedicated apparatus for HDTV disks. Thus, when a standard video disk is played back, it is necessary to connect a high definition video disk playback apparatus and a standard video disk play back apparatus to a video monitor which can be used for playing back both the high definition disks and the standard video disks.

OBJECTS AND SUMMARY OF THE INVENTION

It is, therefore, an object of the present invention is to provide a video disk playback apparatus with compatibility for playing back both the high definition video disks and other video disks such as standard video disks.

According to an aspect of the invention, there is provided a video disk playback apparatus for playing back a disk shaped record medium on which FM modulated video signals are recorded at spiral shaped tracks or concentric circle shaped tracks, the improvement comprising:
pickup means for simultaneously reading at least two tracks adjacently disposed in the radius direction of the tracks;

a first equalizer and a second equalizer to which a first playback signal and a second playback signal are supplied in accordance with the two tracks which are read by the pickup means, respectively; and means for controlling at least one characteristic of the first equalizer and the second equalizer.

According to another aspect of the invention, there is provided a video disk playback apparatus for playing back a disk shaped record medium on which FM modulated video signals are recorded at spiral shaped tracks or concentric circle shaped tracks, the improvement comprising:
pickup means for simultaneously reading at least two tracks adjacently disposed in the radius direction of the tracks;

a first time base compensation device and a second time base compensation device to which a first playback signal and a second playback signal are supplied in accordance with the two tracks which are read by the pickup means, respectively;

means for generating a clock signal with a time base fluctuation component by using at least one of the first playback signal and the second playback signal and for sending the clock signal to the first time base compensation device and the second time base compensation device; and a plurality of the clock signal generation circuits, thereby the clock signal generation circuits are selectable in accordance with the type of the disk shaped record medium.

The above, and other, objects, features and advantage of the present invention will become readily apparent from the following detailed description thereof which is to be read in connection with the accompanying drawings.

BRIEF DESCRIPTION OF THE DRAWING

FIG. 3C is a diagram showing a frequency allocation of record signals of the embodiment;

DETAILED DESCRIPTION OF THE PREFERRED EMBODIMENTS

Now, embodiments according to the present invention will be described in the following order.
 a. One embodiment
 b. Another embodiment
 c. Example of modification a. One embodiment

Figure 1:
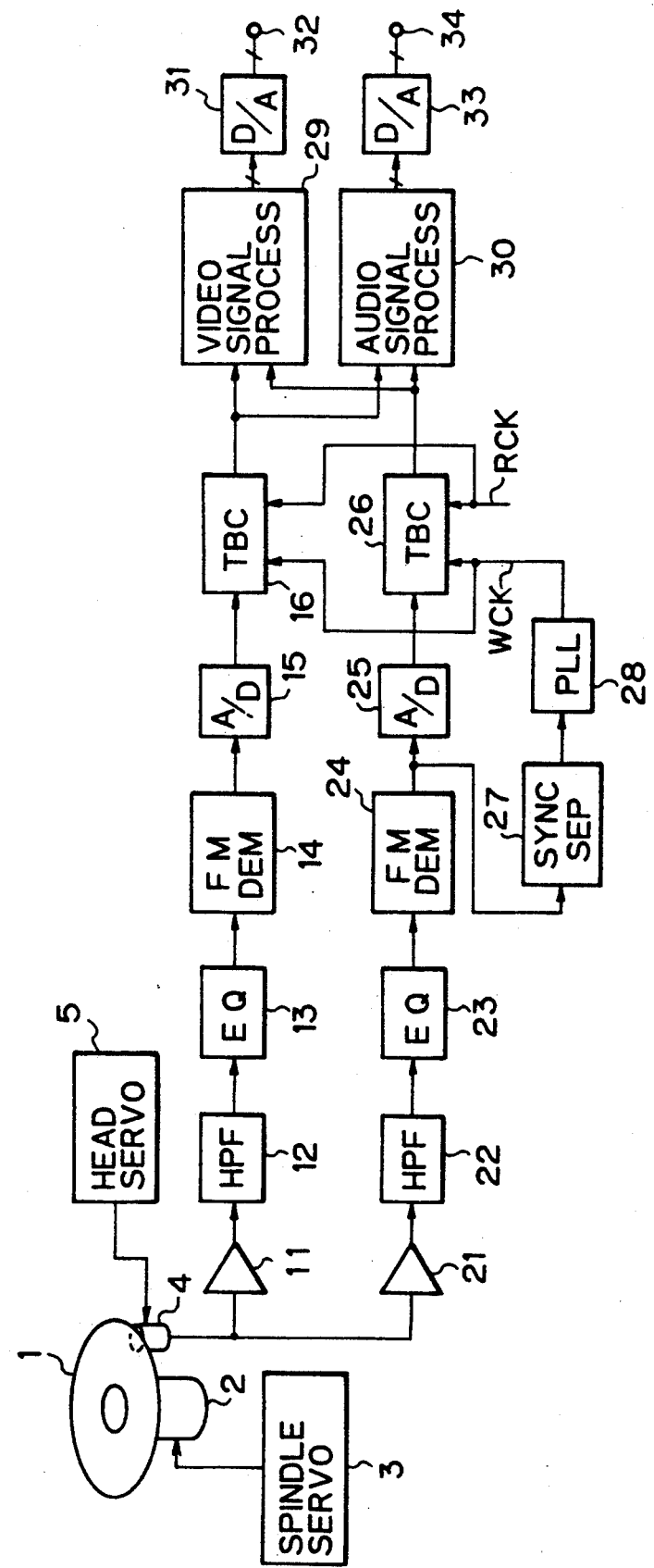
FIG. 1 is a block diagram showing a playback circuit of a video disk which records an HDTV signal.
Figure 2:
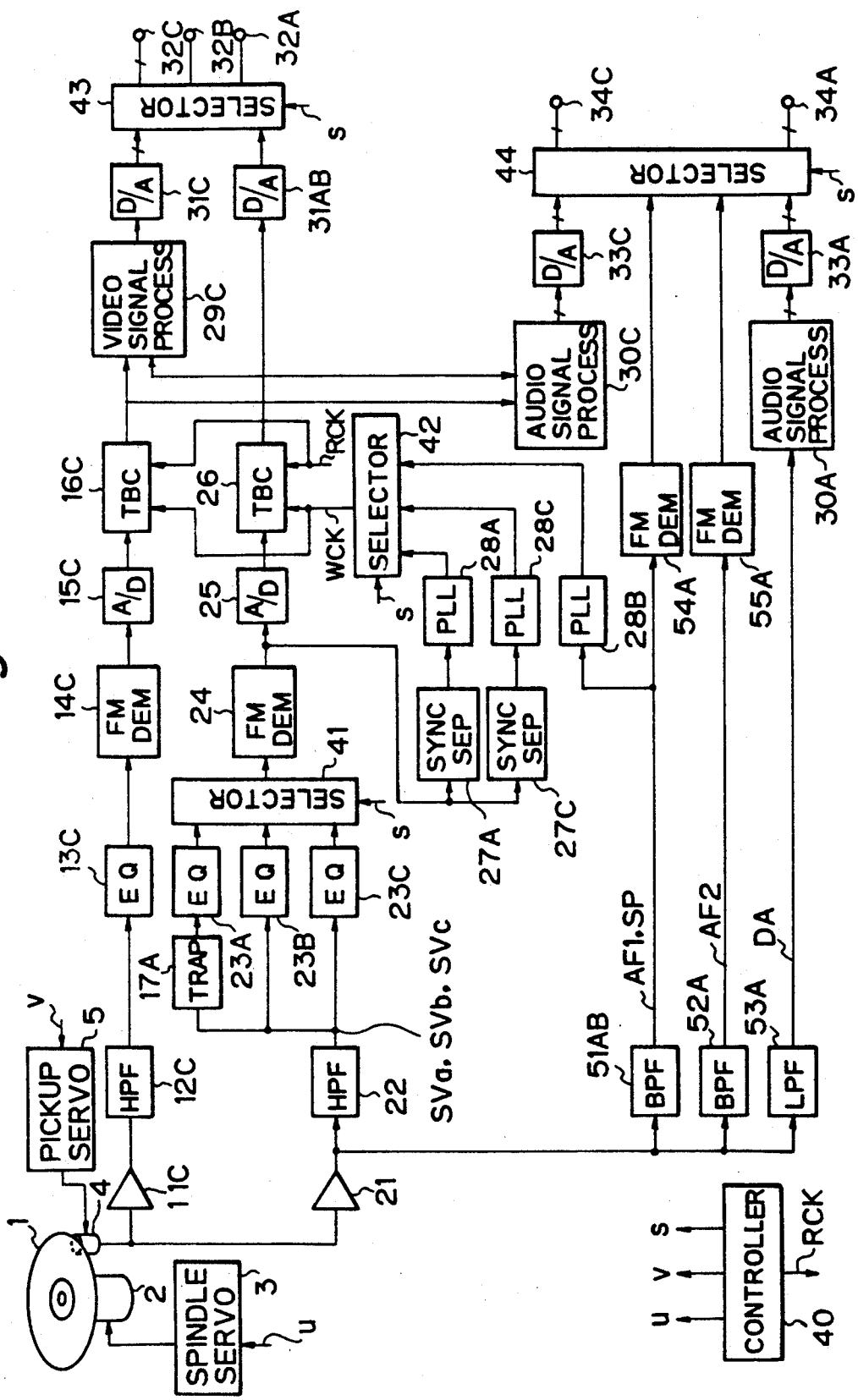
FIG. 2 is a block diagram of one embodiment according to the present invention.
Figure 3:
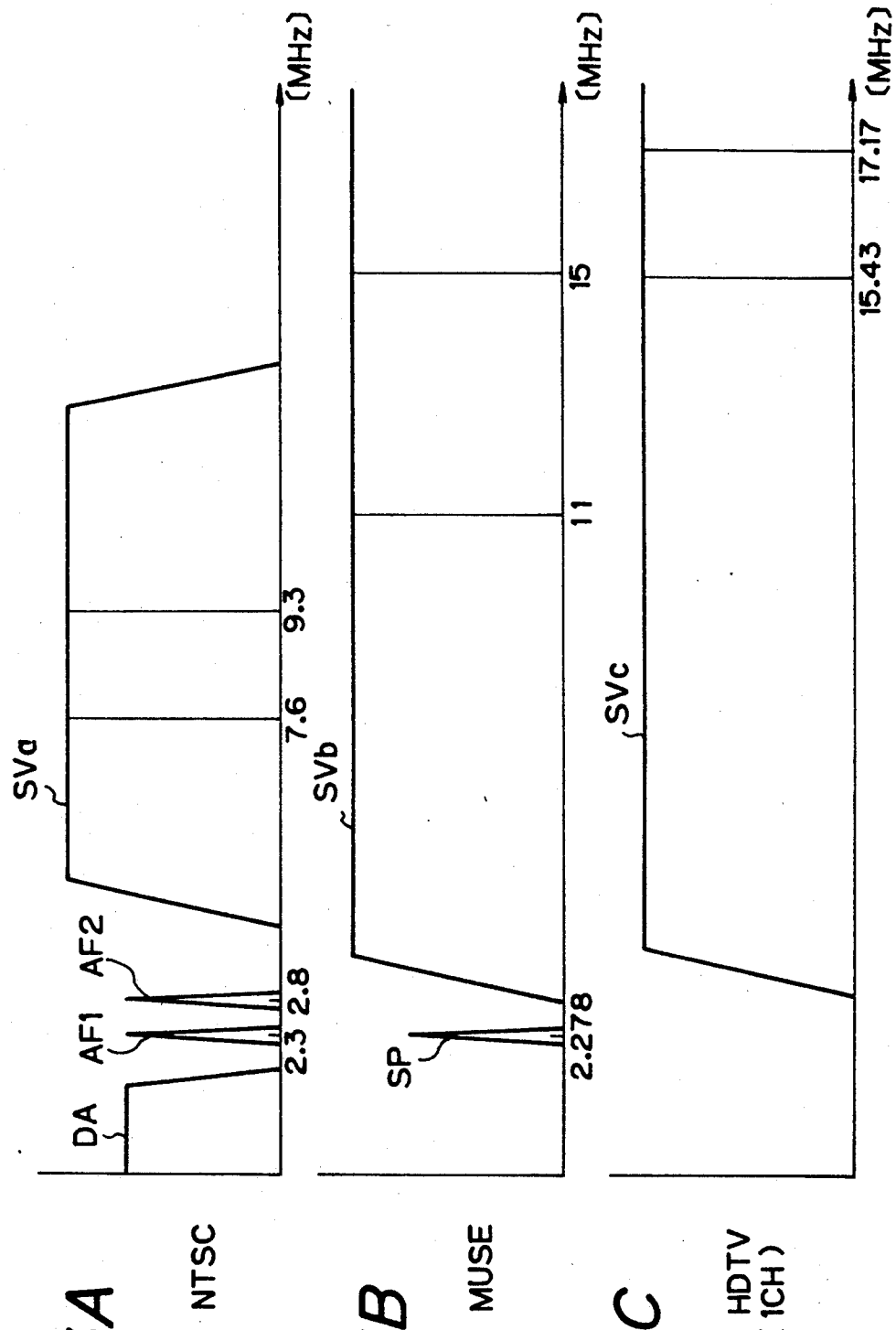
FIG. 3 consisting of FIG. 3A, FIG. 3B.

FIG. 2 shows the construction of one embodiment according to the present invention. FIG. 3 shows the frequency allocation of record signals. According to the embodiment, three types of a disk which record an NTSC system color video signal as a standard definition video signal (referred to as an NTSC disk), a disk which records a MUSE signal for transmitting a high definition color video signal (referred to as a MUSE disk), and a disk which records an HDTV signal (referred to as an HDTV disk) can be played back.

In FIG. 2, reference numeral 1 is an optical disk. On one side or both the sides of the optical disk 1, spiral shaped tracks are formed at predetermined pitches. The disk 1 is one of an NTSC disk, an MUSE disk, an HDTV disk.

Now, with reference to FIG. 3, a record signal of each type disk will be described. FIG. 3A shows a record signal of the NTSC disk. A composite color video signal is FM modulated so that the frequency in the sync chip level is 7.6 MHz and that in the white level is 9.3 MHz. Audio signals in two channels are FM modulated with carrier frequencies of 2.3 MHz and 2.8 MHz. In addition, PCM audio signals which are processed in the same manner as a compact disk are recorded. Thus, on the disk, an FM modulation signal Sva, FM modulation audio signals AF1 and AF2, and a PCM audio signal DA are frequency-multiplexed and recorded.

FIG. 3B shows a record signal of the MUSE disk. A MUSE signal in which a luminance signal and a color difference signal are disposed in predetermined positions is FM modulated so that the frequency in the black level is 11 MHz and that in the white level is 15 MHz. Since a synchronous signal included in the MUSE signal cannot be separated in the same manner as the NTSC system, a pilot signal (for example, a sine wave) SP with a frequency of 2.278 MHz is disposed in a lower band than that of the FM modulation signal SVb.

FIG. 3C shows a record signal of the HDTV disk. An HDTV component signal is composed of a luminance signal Y with a band width of 20 MHz and color difference signals CR and CB with a band width of 6 MHz. To each signal, a horizontal synchronous signal is added. The luminance signal Y whose time base has been expanded and the color difference signals CR and CB whose time base has been compressed are time-division multiplexed. Thus, record signals in two channels are formed. This signal process is the same as that of the conventional HDTV disk. The component signal in each channel is FM modulated so that the frequency in the sync chip level is 15.43 MHz and that in the white level is 17.17 MHz and thereby forming an FM modulation signal Svc.

One of the above mentioned NTSC disk, the MUSE disk, and the HDTV disk is played back as the disk 1. A spindle servo circuit 3 is provided so that the disk 1 is rotated by a spindle motor 2 at a constant speed. Reference numeral 4 is an optical head. The optical head 4 is movable radially on the disk 1 by a feed motor such as a linear motor (not shown in the figure). With respect to the optical head 4, a pickup servo circuit 5 for controlling a head feed servo, a tracking servo, a focus servo is provided.

The rotation speed and the CAV/CLV servo depend on the type of the disk being played back. Thus, a control signal u in accordance with the type of the disk 1 is sent to the spindle servo circuit 3. In addition, a control signal v in accordance with the type of the disk 1 is sent to the pickup servo circuit 5. The switching operation of the pickup servo circuit 5 in accordance with the type of the disk 1 can be omitted. These control signals are generated by a controller 40. In addition, the controller 40 generates a control signal s for controlling selectors which will be described later and a clock RCK on the read side of TBC's.

The optical head 4 diffracts one laser beam to three laser beams which are disposed in closely adjacent positions in the radius direction of the disk 1. The spot of the center beam is positioned at the boundary of the adjacent two tracks. The spots of side beams on both the sides are positioned at the center of each track. The light intensity of the side beams are larger than that of the center beam. With the two side beams, two tracks are played back. By using the difference of playback outputs between the center beam and one side beam and the difference of playback outputs between the center beam and the other side beam, the tracking control is performed.

In the above mentioned manner, the HDTV disk is playbacked parallely on two tracks at a time. However, since the NTSC disk and the MUSE disk do not use such twotrack parallel playback method, only the read output of one side beam is used. Thus, the optical head 4 is traveled on the disk 1 so that one side beam continuously scans tracks on the disk 1.

First, the playback process in the case where the disk 1 is the HDTV disk will be described.

When the playback outputs of the two side beams are named a first channel and a second channel, a playback RF signal in the first channel is sent to an amplifier 11C. In addition, a playback RF signal in the second channel is sent to an amplifier 21. An output signal of the amplifier 11C is sent to an FM demodulator 14C through a high pass filter 12C and an RF equalizer 13C. The RF equalizer 13C compensates the FM modulation signal for a gain drop in the vicinity of the center carrier frequency. For example, the RF equalizer 13C has a frequency characteristic of a cosine curve. As a demodulation output of the FM demodulator 14C, a time-divided and multiplexed signal in the first channel is obtained.

A demodulation output of the FM demodulator 14C is converted into a digital signal by an A/D converter 15C. An output signal of the A/D converter 15C is sent to a TBC (time base compensator) 16C. The TBC 16C is composed of a memory with a storage capacity in accordance with the compensation amount of the time base fluctuation component and a memory control circuit. By using a write clock WCK with the same time base fluctuation component as the playback signal, the time-divided multiplexed signal is written to the memory of the TBC 16C. By using a reference read clock RCK, the playback component signal is read from the memory. The time-divided multiplexed signal whose time base fluctuation component was removed by the TBC 16C is sent to a video signal Process circuit 29C and an audio signal process circuit 30C.

The playback RF signal in the second channel is sent to a high pass filter 22 through the amplifier 21. At an output of the high pass filter 22, the FM modulation signal SVc is generated. An output signal of the high pass filter 22 is sent to an equalizer 23C with the same characteristic as the equalizer 13C. An output signal of the equalizer 23C is selected by a selector 41.

An output signal of the selector 41 is sent to an FM demodulator 24. A demodulation signal in the second channel is sent from the FM demodulator 24 to a A/D converter 25 and a synchronous separation circuit 27C. An output signal of the A/D converter 25 is sent to a TBC 26. A digital signal in the second channel where the time base fluctuation component has been removed by the TBC 26 is sent to the video signal process circuit 29C and the audio signal process circuit 30C along with the digital signal in the first channel.

An HDTV system playback horizontal synchronous signal which has been separated by the synchronous separation circuit 27C is sent to a PLL 28C. The write clock WCK which has a frequency that is a multiple of a horizontal frequency and which has the same phase fluctuation component as the playback horizontal synchronous signal is formed by the PLL 28C. The write clock WCK is sent to the TBC 16C and the TBC 26 through a selector 42.

The video signal process circuit 29C separates a luminance signal and color difference signals, compresses the time base of the luminance signal, expands the time base of the color difference signals, and interpolates the color difference signals. The time-division multiplexed signals in the first and second channels are converted into HDTV digital component signals (Y, CR, and CB) by the video signal process circuit 29C. The component signals are converted into analog component signals by a D/A converter 31C. The HDTV playback component signals are selected by a selector 43. At an output terminal 32C of the selector 43, the component signals are obtained.

On the HDTV disk, the time base of a PCM audio signal has been compressed in a vertical blanking interval. The audio signal process circuit 30C separates the PCM audio signal, expands the time base, and correct an error thereof. Thereafter, the audio signal process circuit 30C outputs digital audio signals in two channels. The playback digital audio signals are converted into analog signals by a D/A converter 33C, sent to a selector 44, and then obtained at an output terminal 34C of the selector 44.

The control signal s in accordance with the type of the disk being played back is formed by the control circuit 40. With the control signal s, the selectors 41, 42, 43, and 44 are controlled.

The NTSC disk and the MUSE disk use for example a playback signal in the second channel. When the NTSC disk the played back, the FM modulation signal SVa is selected by the selector 41 through a trap circuit 17A and an equalizer 23A. The trap circuit 17A is provided so as to remove FM modulation audio signals AF1 and AF2.

When the disk 1 is the NTSC disk, the write clock WCK is generated by a PLL 28A with a horizontal synchronous signal separated by a synchronous separation circuit 27A. An output signal of the PLL 28A is selected by the selector 42. From the TBC 26, NTSC system composite signals whose time base fluctuation component has been removed are obtained. The composite signals are converted into analog signals by a D/A converter 31AB. NTSC color video signals selected by the selector 43 are obtained at an output terminal 32A.

In addition, a band pass filter 51AB with a center frequency of 2.3 MHz and a band pass filter 52A with a center frequency of 2.8 MHz are provided. The band pass filter 51AB separates an FM·modulation audio signal AF1 of the NTSC disk, while the band pass filter 52A separates an FM modulation audio signal AF2 of the NTSC disk. In addition, a low pass filter 53A separates a PCM audio signal DA.

The FM modulation audio signals AF1 and AF2 are sent to FM demodulators 54A and 55A, respectively. Demodulation outputs of the FM demodulators 54A and 55A are sent to the selector 44. Thus, a playback audio signal of the NTSC disk is obtained at an output terminal 34A of the selector 44. An error of the PCM audio signal from the low pass filter 53A is corrected in an audio signal process circuit 30A. The resultant PCM audio signal is converted into an analog audio signal by a D/A converter 33A. The analog audio signal is selected by the selector 44 and then obtained at the output terminal 34A. When the disk 1 is the NTSC disk, the selector 44 selects the signal which has been demodulated from the FM modulation audio signal and the analog signal which has been converted from the PCM audio signal.

When the disk 1 is the MUSE disk, the FM modulation signal SVb obtained at the output of the high pass filter 22 is sent to the FM demodulator 24 through an equalizer 23B and the selector 41. The band pass filter 51AB separates the pilot signal SP. A PLL 28B forms the write clock WCK in synchronization with the pilot signal SP. A playback signal of the MUSE disk is restored to an analog signal by the D/A converter 31AB and then obtained at an output terminal 32B of the selector 43.

In the above mentioned embodiment, in accordance with the type of the optical disk 1, at the output terminals 32A, 32B, and 32C, the NTSC signal, the MOSE signal, and the HDTV signal are obtained, respectively. At the output terminals 34A and 34C, the NTSC audio signal and the HDTV audio signal are obtained, respectively.

b. Another embodiment

Figure 4:
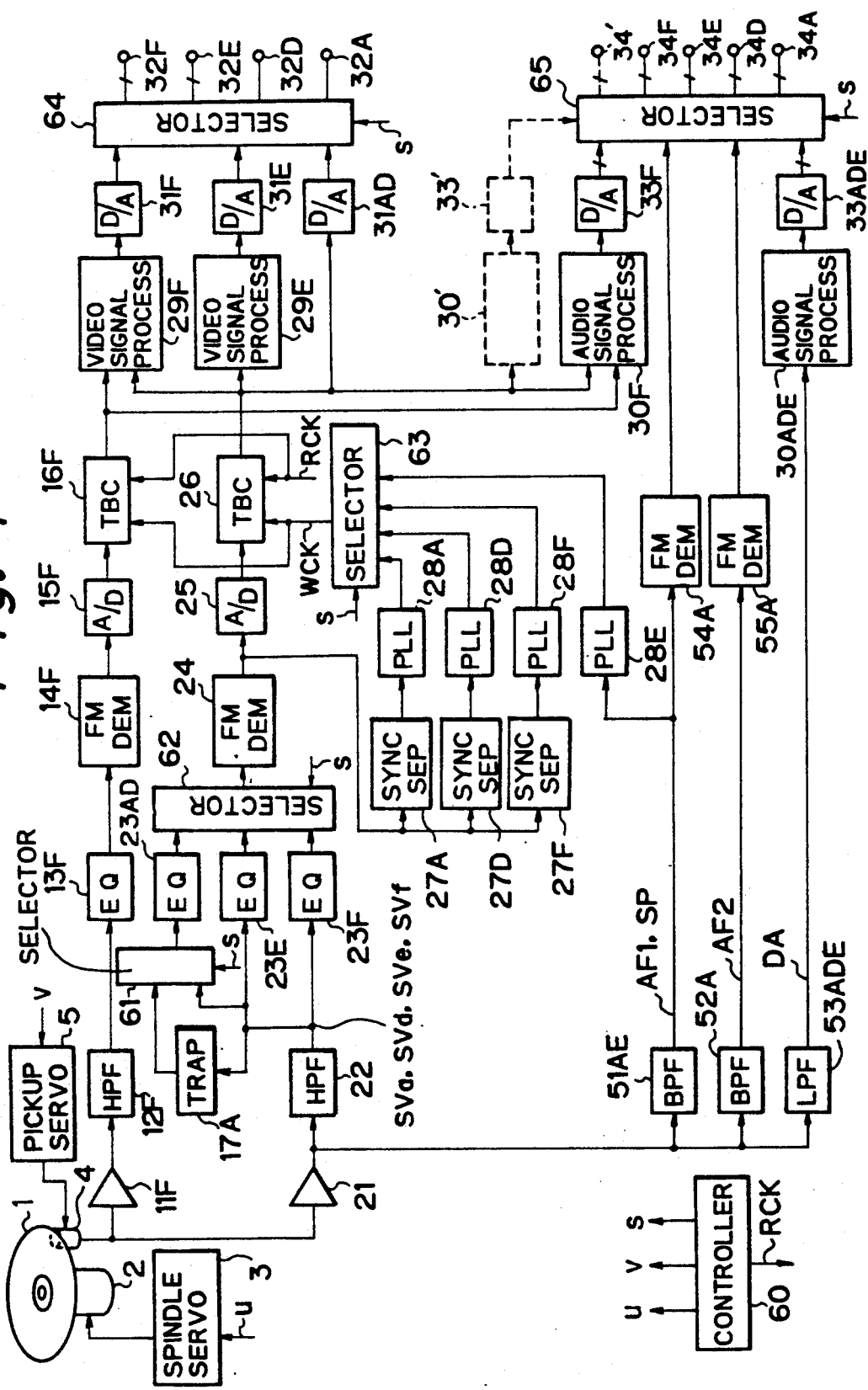
FIG. 4 is a block diagram of another embodiment according to the present invention.

Besides the three types of television systems as were described in the above embodiment, the present invention can be applied to a playback of another type disk. FIG. 4 is a block diagram showing another embodiment according to the present invention.

Figure 5A:
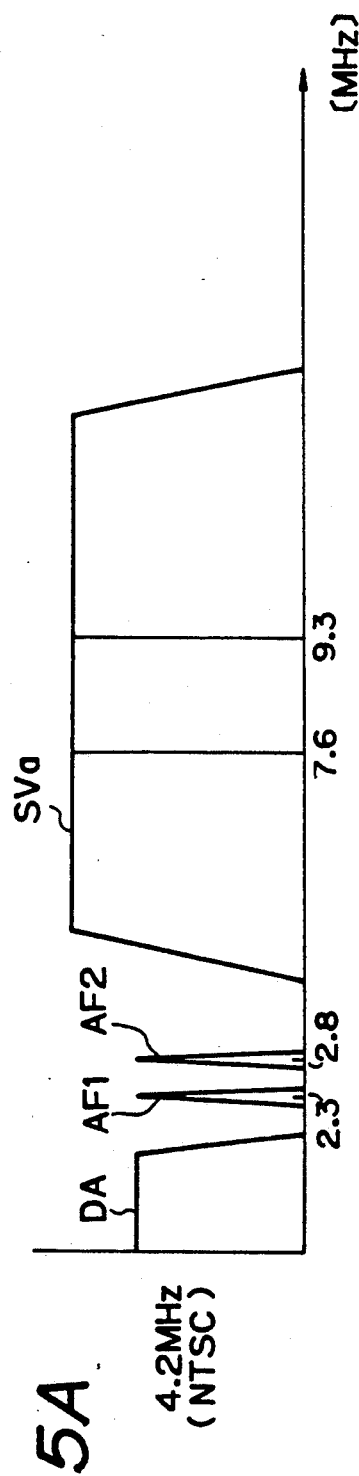
FIG. 5 consisting of FIG. 5A, FIG. 5B, FIG. 5C.
FIG. 5D is a schematic diagram showing a frequency allocation of record signals of another embodiment according to the present invention.

With reference to FIG. 5, record signals of another embodiment will be described. FIG. 5A shows a record signal of the NTSC disk with the same frequency allocation as that shown in FIG. 3A, the band width of the FM modulation signal SVa being 4.2 MHz.

Figure 5B:
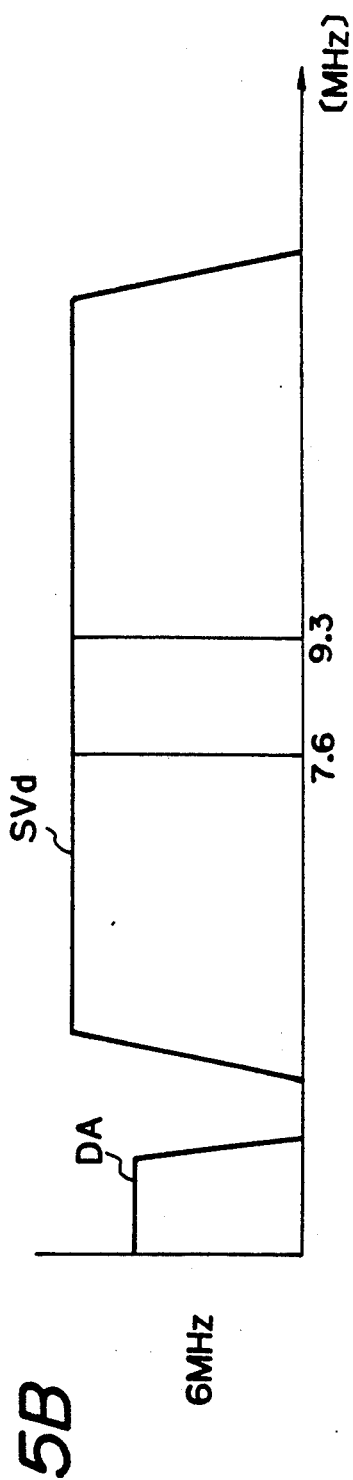

The record signal shown in FIG. 5B is FM modulated with the same frequency as that of the NTSC disk, the band width of the FM modulation signal Svd being 6 MHz which is wider than that shown in FIG. 5A. As an audio signal, only the PCM audio signal DA is recorded. The disk which records the record signal shown in FIG. 5B is referred to as the 6 MHz disk. The 6 MHz disk is used to accomplish a wide band video disk, a video disk with an aspect ratio of (16:9), a disk with component signals, and so forth.

FIG. 5C shows a record signal where the FM modulation signal Sve which is the same as that used in the MUSE disk is recorded, the band width being 8 MHz, the PCM audio signal DA and the pilot signal SP (2.278 MHz) being added. The disk which records the record signal shown in FIG. 5C is referred to as the 8 MHz disk. The 8 MHz disk is used to accomplish a non-interlaced (sequentially scanned) video disk, a video disk with a wide band and a wide screen, and so forth as well as the MUSE disk.

FIG. 5D shows a record signal where the FM modulation signal SVf which is the same as that used in the HDTV disk is recorded, the band width of this signal being 12 MHz. In the record signal shown in FIG. 5D, a PCM audio signal whose time base is compressed during a blanking interval is placed. In addition, like the NTSC disk and so forth, the signals may be continuously recorded on the tracks. Moreover, like the HDTV disk, the signals may be recorded in parallel on two tracks at a time. The disk which records the record signal shown in FIG. 5D is referred to as the 12 MHz disk. The 12 MHz disk (1 channel) is used to accomplish a non-interlaced video disk with a wide band, an non-interlaced video disk with a wide screen, a video disk with component signals, a wide band, and a wide screen, and so forth.

In a playback circuit of another embodiment shown in FIG. 4, selectors 61, 62, 63, 64, and 65 which are selected with a control signal s generated by a controller 60 are provided.

When the disk 1 is the NTSC disk, the selector 61 selects an output of a trap circuit 17A. When the disk 1 is the 6 MHz disk, the selector 61 selects an output of a high pass filter 22. An output of the selector 61 is connected to an equalizer 23AD. When the disk 1 is the NTSC disk or the 6 MHz disk, the selector 62 selects an output of the equalizer 23AD. When the disk 1 is the 8 MHz disk or the 12 MHz disk, the selector 62 selects an output of an equalizer 23E or an output of an equalizer 23F, respectively.

When the disk 1 is the NTSC disk, the selector 63 selects an output of a PLL 28A. When the disk 1 is the 6 MHz disk, the selector 63 selects an output of an PLL 28D. When the disk 1 is the 8 MHz disk, the selector 63 selects an output of a PLL 28E. When the disk 1 is the 12 MHz disk, the selector 63 selects an output of a PLL 28F. To the PLL's 28A, 28D, and 28F, synchronous signals which are separated by separation circuits 27A, 27D, and 27F are sent, respectively. A band pass filter 51AE separates the FM modulation audio signal AF1 of the NTSC disk and the pilot signal SP of the 8 MHz disk.

With respect to the 12 MHz disk, a video signal process circuit 29F and an audio signal process circuit 30F are provided With respect to the NTSC disk and the 6 MHz disk, an analog video signal from an D/A converter 31AD is obtained at output terminals 32A and 32D through the selector 64, respectively.

With respect to the 8 MHz disk, a video signal process circuit 29E is provided. An output of the video signal process circuit 29E is restored to an analog signal by a D/A converter 31E and then obtained at an output terminal 32E of the selector 64. An audio signal process circuit 30ADE processes the PCM audio signal used for the NTSC disk, the 6 MHz disk, and the 8 MHz disk. An output of the audio signal process circuit 30ADE is converted into an analog audio signal by a D/A converter 33ADE.

The selector 65 selectively outputs an audio signal from FM demodulators 54A and 55A, an audio signal from the D/A converter 33ADE, and an audio signal from the D/A converter 33F to output terminals 34A, 34D, 34E, and 34F, respectively. In addition, when the process of the PCM audio signal depends on the disk type, it is possible to additionally provide an audio signal process circuit 30' and a D/A converter 33' shown with dashed boxes so as to obtain audio signal at an output terminal 34' of the selector 65.

As was described above, according to the another embodiment, the NTSC signal, the 6 MHz disk playback signal, the 8 MHz disk playback signal and the 12 MHz disk playback signal are obtained at the respective output terminals 32A, 32D, 32E, and 32F in accordance with the type of the optical disk 1.

c. Example of modification

Besides the above mentioned one embodiment and another embodiment, depending on the disk type, it is possible to commonly use the PLL, D/A converter, and so forth.

In addition, it is possible to use one equalizer whose characteristic is changed with a control signal.

According to the present invention, only by selecting the equalizer for the playback signal and the clock of TBC, various types of disks can be played back.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is;

1. In a video disk playback apparatus for playing back a disk shaped record medium on which FM modulated video signals of different types are recorded at spiral shaped tracks or concentric circle shaped tracks,
  the improvement comprising:
  pickup means for simultaneously reading at least two adjacently disposed tracks;
  a first time base compensation device and a second time base compensation device to which a first playback signal and a second playback signal are supplied in accordance with said two tracks read by said pickup means, respectively;
  means for generating a plurality of clock signals with a respective time base fluctuation component by using at least one of said first playback signal and said second playback signal; and
  means for selecting one of said plurality of clock signals in accordance with the type of signal recorded on the disk, the selected clock signal being fed to said first time base compensation device and to said second time base compensation device for compensating the time base of the played back signals.

2. In a video disk playback apparatus for playing back a disk shaped record medium on which FM modulated video signals are recorded at spiral shaped tracks or concentric circle shaped tracks,
  the improvement comprising:
  pickup means for simultaneously reading at least two adjacently disposed tracks;
  a first equalizer and a second equalizer to which a first playback signal and a second playback signal are supplied in accordance with said two tracks read by said pickup means, respectively
  a time base compensation means having a first time base compensation device and a second time base compensation device to which outputs of said first equalizer and said second equalizer are respectively supplied;
  a plurality of clock generation means each for generating a respective clock signal with a time base fluctuation component by using at least one of said first playback signal and said second playback signal and for sending said respective clock signal to said first time base compensation device and said second time base compensation device; and
  means for controlling at least one characteristic of said first equalizer and said second equalizer and for generating a control signal for selecting one clock signal from said plurality of clock generation means.

3. The video disk playback apparatus as set forth in claim 1 or 2, wherein said disk shaped record medium is an optical type disk, said pickup means diffractively forming a first spot, a second spot, and a third spot which are disposed in different radial positions on said disk record medium, thereby said first spot and said third spot scanning two adjacent tracks, and means for selectively obtaining a playback signal by read outputs of said first spot and said third spot and a state for obtaining a playback signal by a read output of one of said first spot and said third spot.

4. The video disk playback apparatus a set forth in claim 1 or 2, wherein said disk shaped record medium is an optical type disk, said pickup means playing back a wide band television signal by using read outputs of said two tracks, said pickup means playing back a standard band television signal by using a read output of one of said two tracks.

5. In a video disk playback apparatus for playing back a disk shaped record medium on which FM modulated video signals are recorded at spiral shaped tracks or concentric circle shaped tracks, the improvement comprising:

pickup means for simultaneously reading at least two adjacently disposed tracks;

a first equalizer and a second equalizer to which a first playback signal and a second playback signal are supplied in accordance with two tracks read by said pickup means, respectively;

trap means for selectively removing a frequency component of an unnecessary signal of input signals of said first equalizer and said second equalizer;

a time base compensation means having a first time base compensation device and a second time base compensation device to which outputs of said first equalizer and said second equalizer are respectively supplied;

a plurality of generation means for generating a respective plurality of clock signals with respective a time base fluctuation component by using at least one of said first playback signal and said second playback signal and for sending a selected one of said plurality of clock signals to said first time base compensation device and said second time base compensation device; and means for controlling at least one characteristic of said first equalizer and said second equalizer and for generating a control signal for selecting one clock signal from said plurality of clock generation means.

* * * * *